(12) United States Patent
Ming et al.

(10) Patent No.: US 9,111,161 B2
(45) Date of Patent: Aug. 18, 2015

(54) FOUR DIMENSIONAL (4D) COLOR BARCODE FOR HIGH CAPACITY DATA ENCODING AND DECODING

(71) Applicant: KONICA MINOLTA LABORATORY U.S.A., INC., San Mateo, CA (US)

(72) Inventors: Wei Ming, Cupertino, CA (US); Yibin Tian, Menlo Park, CA (US)

(73) Assignee: Konica Minolta Laboratory U.S.A. Inc., San Mateo, CA (US)

( * ) Notice: Subject to any disclaimer, the term of this patent is extended or adjusted under 35 U.S.C. 154(b) by 0 days.

(21) Appl. No.: 14/539,946

(22) Filed: Nov. 12, 2014

(65) Prior Publication Data

US 2015/0069140 A1    Mar. 12, 2015

Related U.S. Application Data

(62) Division of application No. 13/337,036, filed on Dec. 23, 2011, now Pat. No. 8,915,440.

(51) Int. Cl.

| | |
|---|---|
| G06K 7/00 | (2006.01) |
| G06K 19/08 | (2006.01) |
| G06K 1/12 | (2006.01) |
| G06K 19/06 | (2006.01) |
| G06K 7/10 | (2006.01) |

(52) U.S. Cl.
CPC ............ *G06K 1/123* (2013.01); *G06K 7/10712* (2013.01); *G06K 19/0614* (2013.01); *G06K 19/06037* (2013.01); *G06K 2019/06225* (2013.01)

(58) Field of Classification Search
CPC ................ G06K 19/0614; G06K 2019/06225; G06K 19/06037
USPC .......................... 235/462.04, 494, 462.01, 469
See application file for complete search history.

(56) References Cited

U.S. PATENT DOCUMENTS

| | | | |
|---|---|---|---|
| 5,869,828 A | 2/1999 | Braginsky | |
| 6,915,011 B2 | 7/2005 | Loui et al. | |
| 6,981,644 B2 | 1/2006 | Cheong et al. | |
| 7,478,746 B2 | 1/2009 | Cattrone | |
| 7,533,817 B2 | 5/2009 | Ming et al. | |
| 7,751,585 B2 | 7/2010 | Jancke | |
| 8,006,911 B2 | 8/2011 | Yi et al. | |
| 8,047,447 B2 | 11/2011 | Bulan et al. | |
| 2005/0023354 A1 | 2/2005 | Sali et al. | |
| 2007/0278303 A1 | 12/2007 | Cattrone | |
| 2008/0035730 A1* | 2/2008 | Look | 235/462.07 |

(Continued)

*Primary Examiner* — Michael G Lee
*Assistant Examiner* — Suezu Ellis
(74) *Attorney, Agent, or Firm* — Chen Yoshimura LLP

(57) ABSTRACT

A method for encoding and decoding color barcodes to increase their data capacity. The encoding steps include determining a shape, a foreground color and a background color for each data cell, wherein a combination of the shape, foreground and background colors for the data cell is chosen from a plurality of such combinations in accordance with a value of the digital data to be encoded; and coloring some pixels in the data cell with a foreground color and other pixels with a background color, in accordance with the shape, foreground and background colors for the data cell determined above. The decoding steps include segmenting the data cells, recognizing a shape, a foreground color of the shape and a background color of the data cell, and obtaining digital data from a combination of the shape and foreground and background colors in each data cell.

9 Claims, 6 Drawing Sheets

(56) References Cited

U.S. PATENT DOCUMENTS

| | | |
|---|---|---|
| 2010/0034468 A1 | 2/2010 | Boncyk et al. |
| 2010/0282851 A1 | 11/2010 | Bulan et al. |
| 2011/0186632 A1 | 8/2011 | Yi et al. |
| 2013/0157760 A1 | 6/2013 | Boudville |
| 2013/0161395 A1 | 6/2013 | Tian et al. |
| 2013/0334313 A1* | 12/2013 | Ganesan .................. 235/462.04 |
| 2014/0346231 A1* | 11/2014 | Al-Omari et al. ........ 235/462.04 |

* cited by examiner

FOUR DIMENSIONAL (4D) COLOR BARCODE FOR HIGH CAPACITY DATA ENCODING AND DECODING

This application is related to commonly owned U.S. patent application Ser. No. 13/336,627 filed on Dec. 23, 2011 for "Four Dimensional (4D) Color Barcode For High Capacity Data Encoding And Decoding", which is pending and is herein incorporated by reference in their entireties.

BACKGROUND OF THE INVENTION

1. Field of the Invention

This invention generally relates to color barcodes type of machine-readable symbology for encoding digital data, and more particularly, it relates to a method for increasing the data capacity of color barcodes for high capacity data encoding and decoding.

2. Description of the Related Art

Color barcodes are a type of machine-readable symbology for recording digital data. Conventional one-dimensional and two-dimensional black and white barcodes are widely used. Recently color barcodes have also been introduced to increase the data capacity of the barcodes, one more "dimension" being added to the barcodes in addition to the intensity of light reflection to represent additional data, and are often referred to as "three dimensional (3D)" barcodes. For example, U.S. Pat. Nos. 7,478,746, 7,533,817, 7,751,585 and 8,006,911 proposed various ways of encoding data with color barcodes. Due to relatively poor color reproducing fidelity during the printing and imaging process, the number of colors that can be used in a given barcode is limited. Thus additional measures should be taken to further increase the data capacity of color barcodes. U.S. Pat. No. 7,751,585 utilized color triangles instead of conventional rectangles/squares to reduce barcode size and thus increase its data capacity. U.S. Pat. No. 8,047,447 suggested to use printer halftone dot orientations of each of the primary printing color channels to increase the amount of encoded data.

Color printers are typically used to produce color barcodes on recoding media such as paper, transparency, plastic sheet, fabric, etc. Color printers generally use toning materials, such as color inks and toner particles, of the subtractive colors, i.e., cyan (C), magenta (M) and yellow (Y). These colors (C, M and Y), together with black (K), are usually referred to as the CMYK colors or the CMYK color space. To a certain extent, colors printed by a printer depend on the characteristics of the toning material sets used by the printer.

Oftentimes color barcodes may be displayed on a color display device such as a cathode ray tube (CRT) monitor, a liquid crystal display (LCD) monitor, etc. Color displays generally use display pixels having additive colors, i.e., red (R), green (G) and blue (B). These colors (R, G and B) are usually referred to as the RGB colors or the RGB color space.

In addition, a color scanner, camera or other detecting device is often used to scan or read a color barcode. A color scanner or detector typically uses a set of color filters (e.g. RGB filters) to detect the color of the received light.

With the increased use of barcodes and the advancement in technology that enhanced the resolution of color printers, displays and scanners, it is desirable to introduce new ways for increasing the data capacity of color barcodes for high capacity data encoding and decoding.

SUMMARY OF THE INVENTION

The present invention is directed to a method for increasing the data capacity of color barcodes for high capacity data encoding and decoding.

An object of the present invention is to provide color barcodes that have enhanced data capacity by using various combinations of colors and shapes in the barcodes to encode additional digital data.

Another object of the present invention is to provide color barcodes that use contrasting and complementary colors for foreground and background shapes to prevent color interference and thereby increase the accuracy of data encoding and decoding of the color barcodes.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, one exemplary embodiment of the present invention provides a method for encoding a color barcode having a plurality of cells including data cells, comprising the steps of: (a) determining a shape, a foreground color and a background color for each data cell to encode digital data, wherein a combination of the shape, foreground color and background color for the data cell is chosen from a plurality of combinations of shapes and foreground and background colors in accordance with a value of the digital data to be encoded in the data cell; and (b) coloring for each data cell, a subset of a plurality of pixels in the data cell with a foreground color and the remaining pixels with a background color, in accordance with the shape, foreground color and background color for the data cell determined in the step (a).

In another aspect, one exemplary embodiment of the present invention provides a method for decoding a color barcode, comprising the steps of: (a) segmenting a plurality of data cells in the color barcode; (b) recognizing a shape formed by a subset of pixels in each data cell, a foreground color of the recognized shape in a data cell, and a background color of the remaining pixel of the same data cell; and (c) obtaining digital data from a combination of the recognized shape and the foreground and background colors in each data cell.

In yet another aspect, one exemplary embodiment of the present invention further provides a computer program product comprising a computer usable non-transitory medium (e.g. memory or storage device) having a computer readable program code embedded therein for controlling a data processing apparatus, the computer readable program code configured to cause the data processing apparatus to execute a process for encoding digital data in a color barcode, which process includes the steps of: (a) determining a shape, a foreground color and a background color for each data cell to encode digital data, wherein a combination of the shape, foreground color and background color for the data cell is chosen from a plurality of combinations of shapes and foreground and background colors in accordance with a value of the digital data to be encoded in the data cell; and (b) coloring for each data cell, a subset of a plurality of pixels in the data cell with a foreground color and the remaining pixels with a background color, in accordance with the shape, foreground color and background color for the data cell determined in the step (a).

In still another aspect, one exemplary embodiment of the present invention further provides a computer program product comprising a computer usable non-transitory medium (e.g. memory or storage device) having a computer readable program code embedded therein for controlling a data processing apparatus, the computer readable program code configured to cause the data processing apparatus to execute a process for decoding digital data in a color barcode, which process includes the steps of: (a) segmenting a plurality of data cells in the color barcode; (b) recognizing a shape formed by a subset of pixels in each data cell, a foreground color of the recognized shape in a data cell, and a background color of the remaining pixel of the same data cell; and (c) obtaining digital data from a combination of the recognized shape and the foreground and background colors in each data cell.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1A:
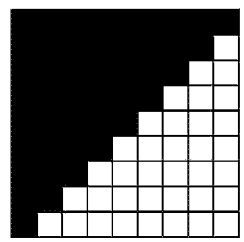
FIGS. 1(a) through 1(j) are diagrams illustrating the various exemplary shapes used for the data cells of a color barcode according to an embodiment of the present invention.
Figure 1B:
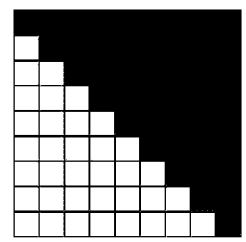
Figure 1C:
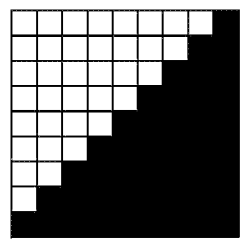
Figure 1D:
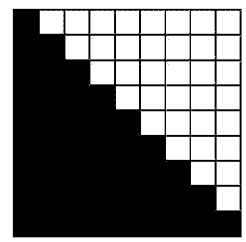
Figure 1E:
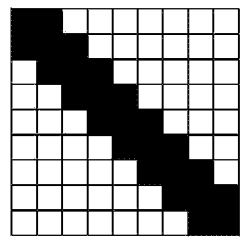
Figure 1F:
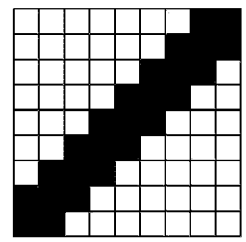
Figure 1G:
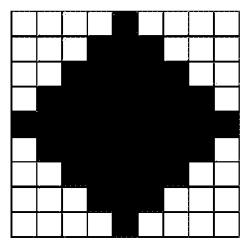
Figure 1H:
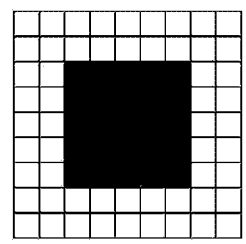
Figure 1I:
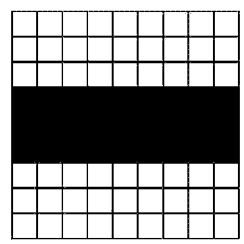
Figure 1J:
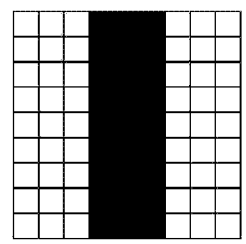

As mentioned earlier, the present invention is directed to encoding and decoding color barcodes that have increased data capacity by using various combinations of colors and shapes in the barcodes to encode and decode digital data, and computer program product that causes a data processing apparatus to perform these methods. Since two more dimensions (color and shape) are used in addition to the traditional two dimensional barcodes, the new color barcodes of the present invention may be referred to as four dimensional (4D) barcodes.

In a barcode, the majority of the cells are for data encoding. Each of the data encoding cell consists of a rectangular or square array of pixels (e.g., M*N pixels). According to the exemplary embodiments shown in FIGS. 1(a) through 1(j), the array of pixels in each data cell is arranged in such a way that it combines color and shapes in various configuration and orientations to encode digital data.

As shown in FIGS. 1(a) through 1(j), for example, if the cell consists of N*N (e.g., N=9) pixels, a number of shapes or configurations (combined with there orientations) may be used to encode different digital data. Of course the number of usable shapes depends on the cell array size and the quality of reproducing and capturing devices for a specific application, and a minimum requirement on N depends on the number of shapes to be used.

In addition to use the shapes/configurations and their orientations to encode different digital data, contrasting and complementary colors can be used for foreground and background shape/configurations to reduce or prevent color interference between the colored shapes to increase the encoding/decoding accuracy. For example, for the rectangular shape shown in FIG. 1(a), the upper left triangle (shown in black in the drawing) may be colored by a foreground color and deemed as the foreground shape or part of the cell, and the lower right triangle (shown in black in the drawing) may be a white background or colored by a background color and deemed as the background shape or part of the cell. In order to reduce or prevent interference at the adjacent pixels at the boundary of the foreground and background parts, the exemplary embodiments of the present invention use complementary colors to contrast the foreground and background, so that the accuracy of encoding/decoding of the color barcode can be improved.

In addition, the combination of maximum density and lower density of primary colors is preferred, which reduces the effect of color smear and therefore improves the accuracy of decoding.

Figure 2A:
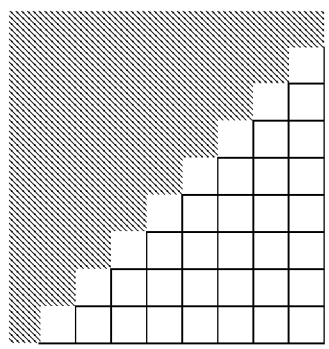
FIGS. 2(a) through 2(p) are diagrams illustrating the various exemplary complementary colors used for the foreground and background of the data cells of a color barcode according to an embodiment of the present invention.
Figure 2B:
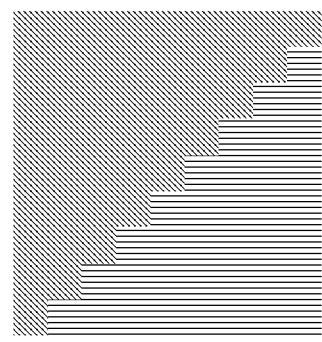
Figure 2C:
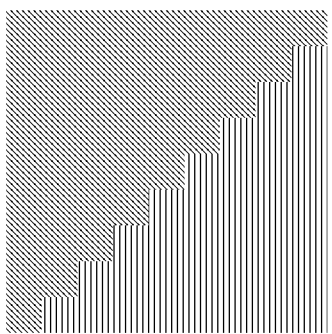
Figure 2D:
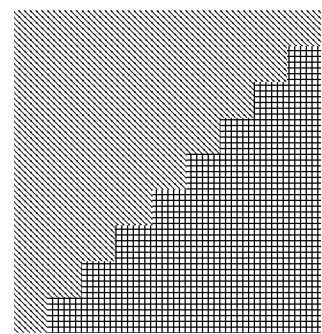
Figure 2E:
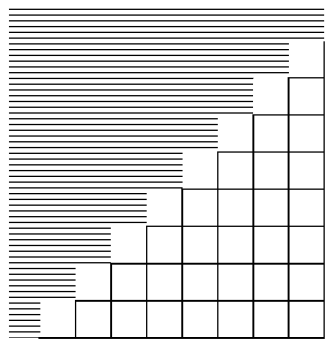
Figure 2F:
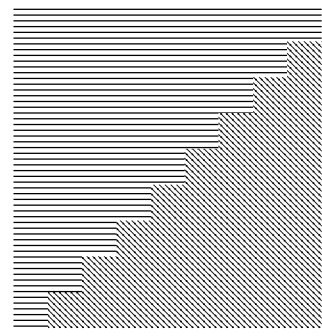
Figure 2G:
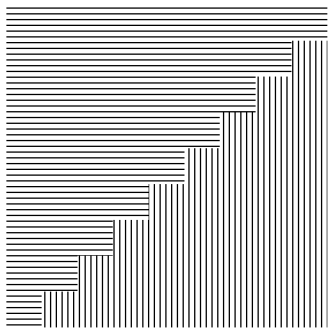
Figure 2H:
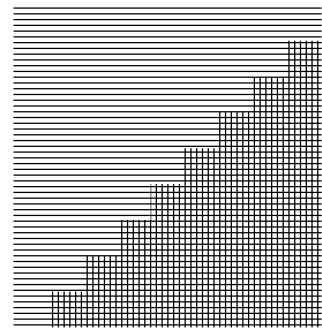
Figure 2I:
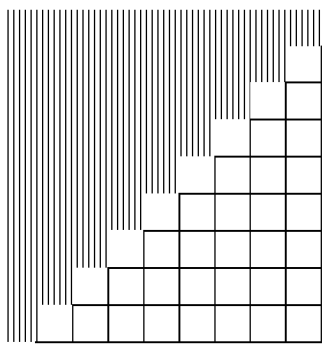
Figure 2J:
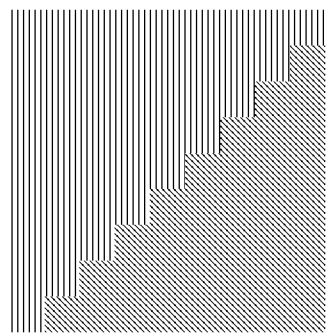
Figure 2K:
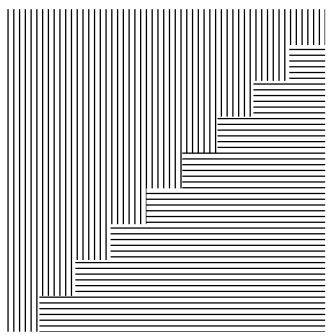
Figure 2L:
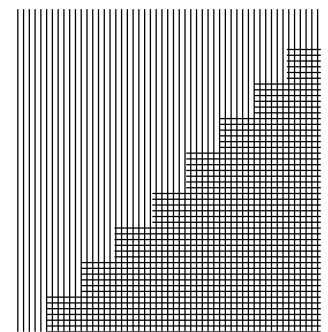
Figure 2M:
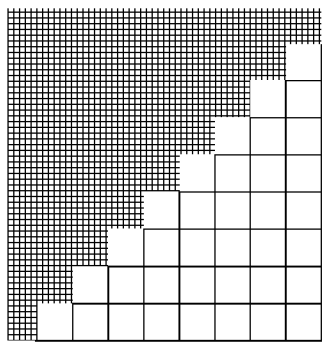
Figure 2N:
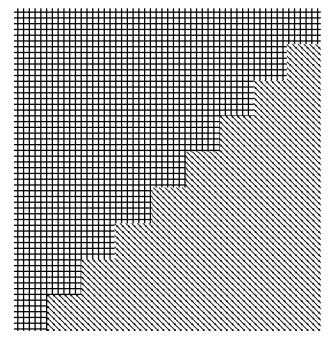
Figure 2O:
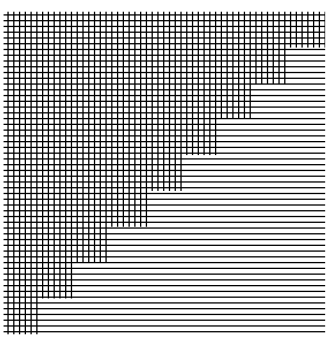
Figure 2P:
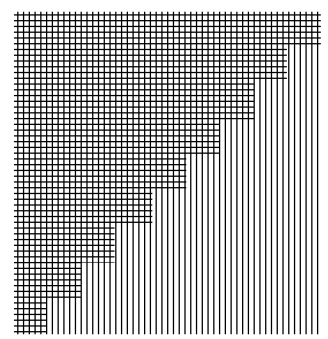

As the exemplary embodiments of the present invention shown in FIGS. 2(a) through 2(p), for a same rectangular shape in a cell, four (4) primary colors of the CMYK color space (i.e., C, M, Y, K) are used for the foreground, and for each primary color used to color the foreground, the background can be white (W) or colored with the other three (3) of the primary colors of the CMYK color space, as illustrated in the table below:

| FIG. | Foreground | Background |
| --- | --- | --- |
| 2(a) | C | W |
| 2(b) | C | M |
| 2(c) | C | Y |
| 2(d) | C | K |
| 2(e) | M | W |
| 2(f) | M | C |
| 2(g) | M | Y |
| 2(h) | M | K |
| 2(i) | Y | W |
| 2(j) | Y | C |
| 2(k) | Y | M |
| 2(l) | Y | K |
| 2(m) | K | W |
| 2(n) | K | C |
| 2(o) | K | M |
| 2(p) | K | Y |

It is noted that when references are made to primary colors, it is usually the CMYK or RGB color spaces. Sometimes primary colors, or color barcode may be represented in other color spaces, such as Lab, JCH, LUV, etc. However, when a primary color is originally defined in another color space, it may no longer be a primary color after converting to the CMYK color space. Therefore, if primary colors are defined in other color spaces, certain procedures, for example the Spot Color Printing, should be utilized for printing the barcode to make sure that only primary colors in a preferred color space (here the CMYK color space) are used.

In addition, sometimes more sophisticated toner is used for printing, which uses some other colorants in addition to the CMYK colors, also known as the "hi-fi" colorants. In such cases, each of the "hi-fi" colors can also be utilized along with the CMYK colors for the coding scheme described above. For example, if there are two "hi-fi" colorants (H1 and H2) in the toner, the total number of colors can be directly printed without mixing or gradation is 6 (C, M, Y, K, H1 and H2), and the possible color combinations of foreground and background colors for each shape is increased to 36 combinations.

In a barcode that implements the present invention embodiments, the rectangular (or square) area of the barcode is divided into an array of cells (e.g., U*V cells), and each cell itself consists of a rectangular (or square) array of pixels (e.g., M*N pixels). A certain number of cells on the corners may be used as locator cells (for decoding purposes), and certain other cells located adjacent to the locator cells may be used as color reference cells, which help the detection of colors during the decoding process as colors tend to drift during printing and imaging processes.

Further, the size of the barcode (i.e., U*V) can also be coded in cells near the locators to help decoding the barcode. Optionally, additional locators and reference cells may be place at the center of the barcode too if the barcode size is too large, and shape reference cells may also be added near the color reference cells. Optionally, white spaces may be added between cells to reduce color interferences between neighboring cells to improve the accuracy of the decoding.

Figure 3:
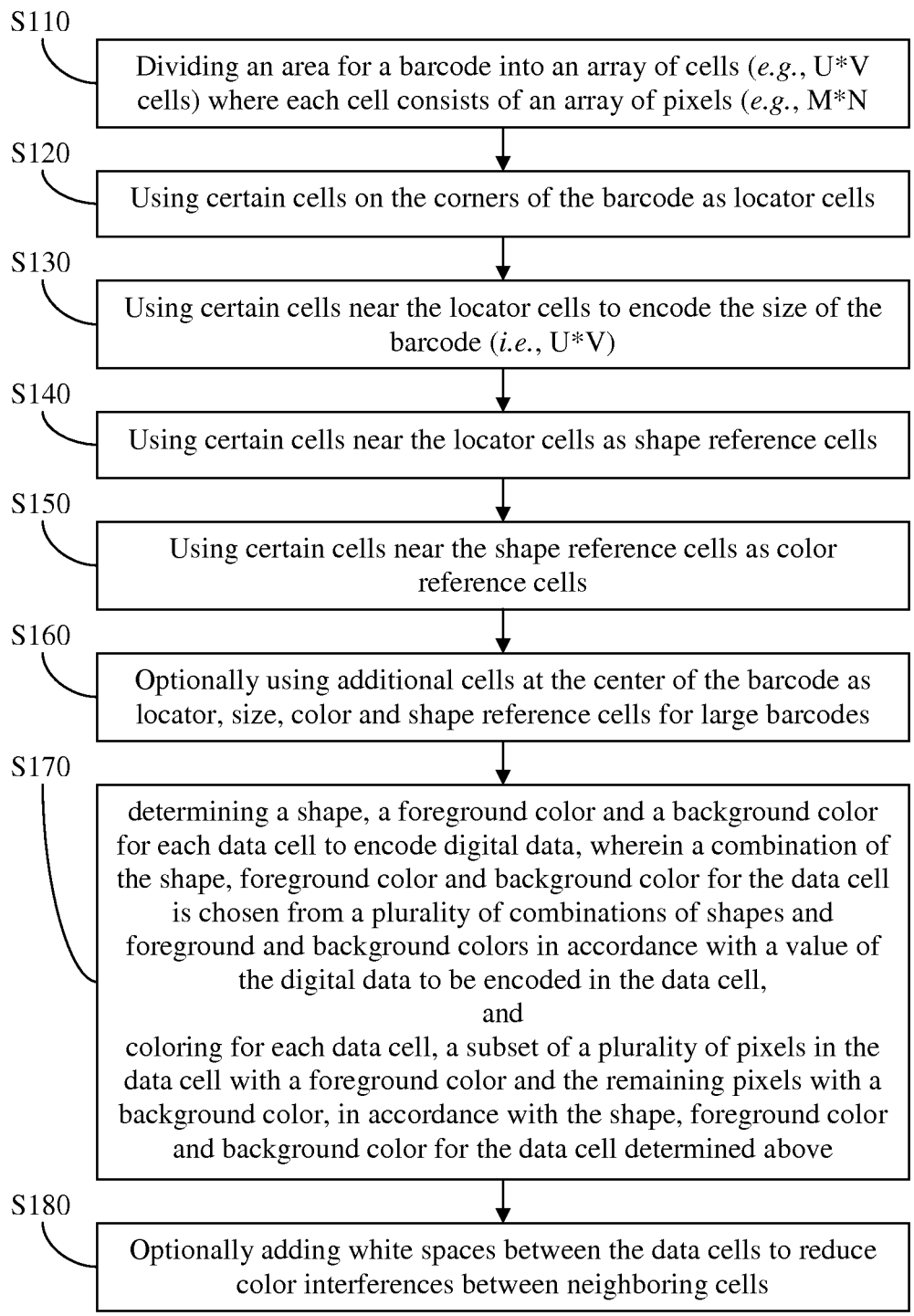
FIG. 3 is a flowchart illustrating the steps of encoding a color barcode according to an exemplary embodiment of the present invention.

Referring to FIG. 3, there are illustrated the basic steps of providing, producing, generating, rendering or encoding a barcode (either by a computer, printer or electronic transmission) in accordance with an exemplary embodiment of the present invention. Each step of this encoding process is implemented by executing a color barcode rendering software program, which may reside on a computer connected to one or more printers or on a printer itself (such as the computer 12 and printer 14 shown in FIG. 5(*a*)), or on a color barcode generating device. The program is executed by the central processing unit (CPU) of the computer or by the data processor or processing unit of the printer or device. Data or other information used when executing the encoding program may be stored in and retrieved from a memory or storage unit of the computer, printer or device.

In Step 110, a rectangular (or square) area for a barcode to be generated is divided into an array of cells (e.g., U*V cells). Each cell consists of a rectangular (or square) array of pixels (e.g., M*N pixels).

In Step 120, certain cells on the corners of the area for the barcode are used as locator cells. For instance, the cells at the four corners of the barcode are colored black in L shapes to be used as the locator cells. The orientation of the barcode can be specified by a corner locator that is different from the other three corner locators.

In Step 130, certain cells near the locator cells are colored to encode the size of the barcode to be generated (i.e., U*V).

In Step 140, certain cells near the locator cells are colored in accordance with shapes possibly used in the barcode as shape reference cells.

In Step 150, certain cells near the shape reference cells are colored in accordance with colors possibly used in the barcode as color reference cells.

In Step 160, additional cells at the center of the area of the barcode are redundantly colored to be used as locator cells, barcode size cells, color reference cells, and shape reference cells if the barcode size is too large. However, the step 160 is optional.

In Step 170, the other cells are colored to be used as data encoding cells to encode digital data. Certain pixels of each cell may form a shape or configuration which is deemed the foreground part of the cell, and the remaining pixels form the background part of the cell. As discussed above, complementary primary colors from the same color space are used for the foreground and background to reduce and prevent color interference and therefore improve the accuracy of the encoding of the digital data. The remaining pixels may be left white, or uncolored. Within the meaning of the term "color" or "coloring" as used in this disclosure, "coloring a pixel with a particular color" includes leaving the pixel uncolored, i.e., the particular color may be white. The different shape, foreground color and background color combinations can represent different data values, respectively. In a certain embodiment, the digital data may be divided into subsets of the digital data, and each of the subsets may be encoded to a corresponding one of the different shape, foreground color and background color combinations, with referring to a look-up-table defining an encoding rule from digital values to shape, foreground color and background color combinations, respectively.

In Step 180, white spaces are optionally added between the data cells to reduce color interferences between neighboring cells.

Figure 4:
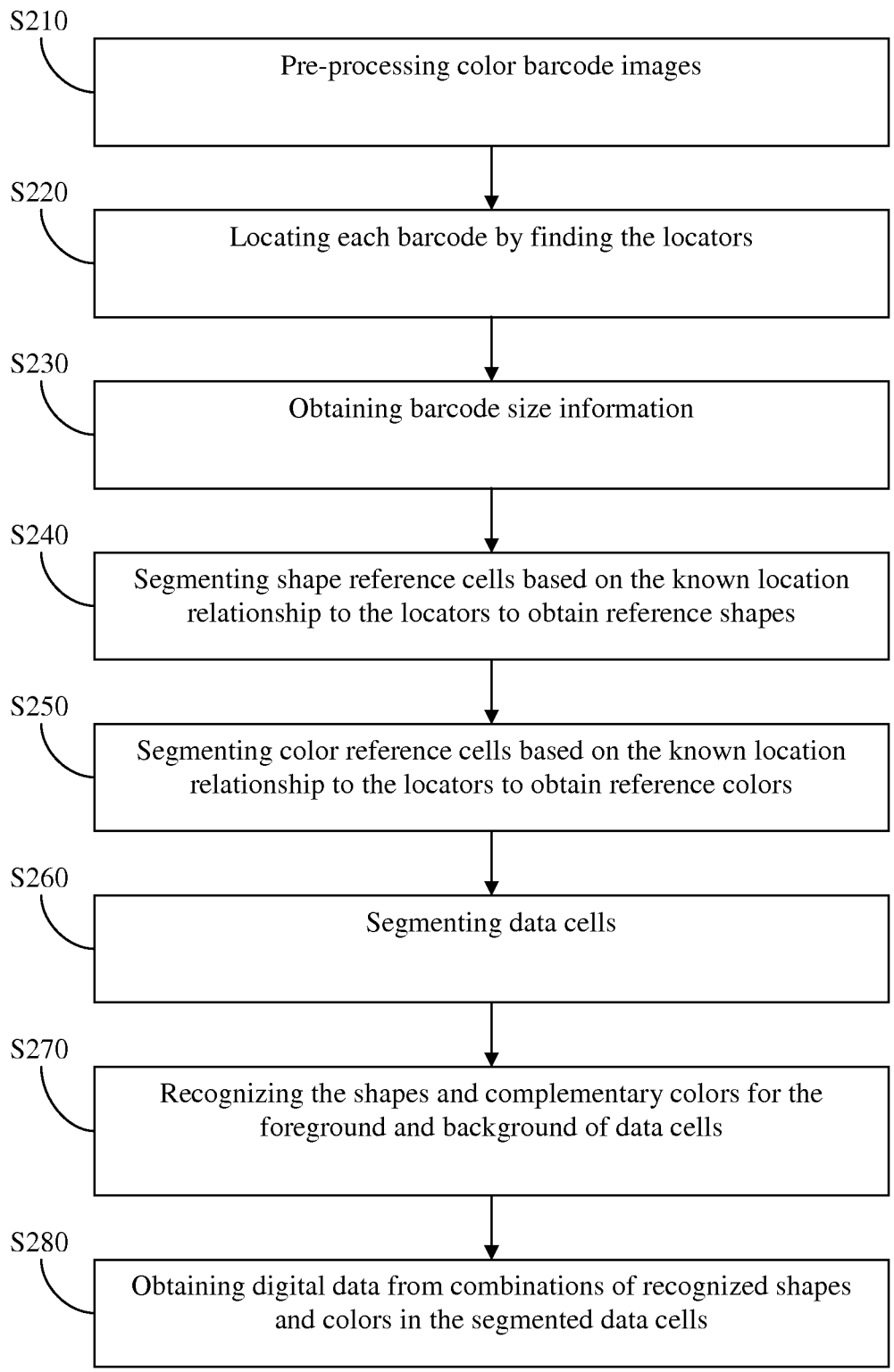
FIG. 4 is a flowchart illustrating the steps of decoding a color barcode according to an exemplary embodiment of the present invention.

Referring to FIG. 4, there are illustrated the basic steps of capturing, scanning or decoding a barcode (either from scanners, cameras or electronic transmission) in accordance with an exemplary embodiment of the present invention. Each step of this decoding process is implemented by executing a color barcode decoding software program, which may reside on a computer connected to one or more scanners or on a scanner itself (such as the computer 12 and scanner 16 shown in FIG. 5(*b*)), or on a color barcode decoding device. The program is executed by the central processing unit (CPU) of the computer or by the data processor or processing unit of the scanner or device. Data or other information used when executing the decoding program may be stored in and retrieved from a memory or storage unit of the computer, scanner or other imaging device.

In Step 210, color barcode images are pre-processed, such as de-noising, distortion correction (perspective correction may be needed for camera-captured images). Various conventional techniques can be employed for this step.

In Step 220, each barcode is located by finding the locators. For example, L shaped locators at the corners of the barcode, and the locator at the center of the barcode when available, may be located by pattern recognition methods utilizing their color (black or white), shape and location (corners for L locators). The orientation of the barcode is identified according the corner locator that is different from the other three corner locators. A de-skew step may need to be carried out.

In Step 230, barcode size information is obtained. For instance, such barcode size information may be extracted from the corresponding barcode size cells, as explained in Step 130 and 160 of FIG. 3.

In Step 240, shape reference cells are segmented based on the known location relationship to the locators to obtain reference shapes.

In Step 250, color reference cells are segmented based on the known location relationship to the locators to obtain reference colors.

In Step 260, data cells are segmented. If white spaces are added between cells, the segmentation can be simply carried out by finding white spaces across the whole barcode in horizontal and vertical direction. The barcode size can be used to facilitate this process. If no white spaces are added between cells, horizontal and vertical edge segments can be detected, and the edge segments are further linked or fitted to a grid. Again, the barcode size can be used to facilitate this process.

In Step 270, the shapes and foreground and background colors of data cells are recognized. In the case of shapes, shape features (for example, translation and scaling invariant image moments) can be utilized for shape recognition. Or if reference shapes are used, template matching methods can be used as well (such as cross-correlation or Hausdorff distance). In the case of colors, the distances between the target color and the references colors can be used for color recognition. Shape and color recognitions can be combined together.

In Step 280, digital data from the segmented data cells is obtained based on the recognition of the shapes and the foreground and background colors of the data cells. Each unique combination of a shape and a color may represent a unique data item or a data value, and from interpreting a combination of a certain shape and a certain color the digital data represented by the combination can be obtained. In a certain embodiment, the shape and color combinations of data cells are referred to a look-up-table to reproduce the digital data. The look-up-table used in this Step may have a reverse relationship in terms of input and output from the look-up-table used in the Step 170.

The process of encoding and decoding barcodes may be performed by barcode rendering and decoding software programs, respectively. A color barcode renderer program may reside on a computer connected to one or more printers, or on a printer itself. A color barcode decoder program may reside on a computer connected to one or more scanners/cameras, or on a scanner/camera itself.

The methods described above may be implemented by a computer software program running on a computer, a printer, a scanner/camera, and/or other data processing apparatus.

Figure 5A:
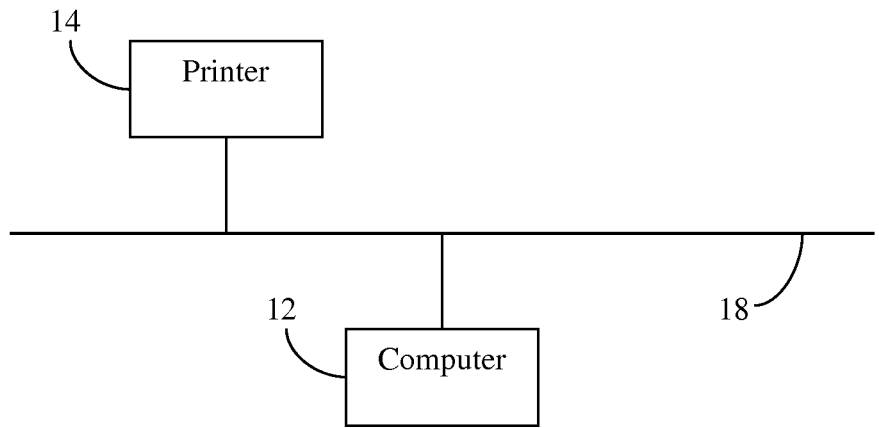
FIG. 5(a) is a schematic diagram illustrating a system in which one exemplary embodiment of the present invention may be implemented.
Figure 5B:
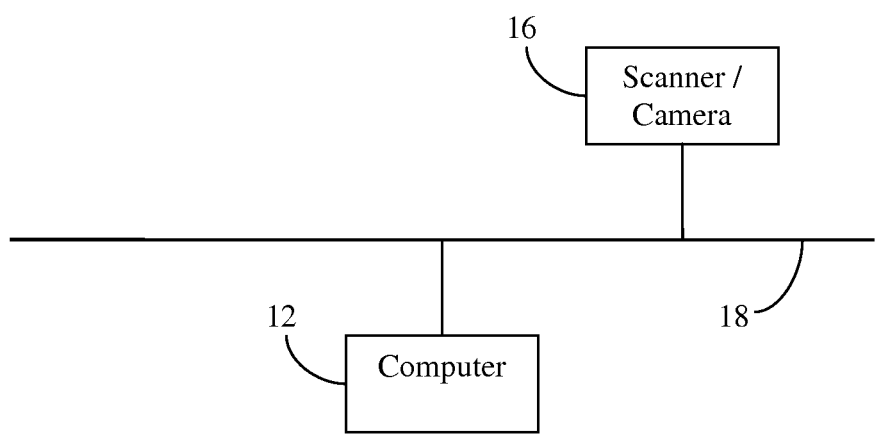
FIG. 5(b) is a schematic diagram illustrating a system in which another exemplary embodiment of the present invention may be implemented.

Referring to FIGS. 5(*a*) and 5(*b*), there are illustrated exemplary systems in which the methods of the present invention may be implemented. In the exemplary embodiment shown in FIG. 5(*a*), the system may include a computer 12 and a printer 14 connected to each other by a network or other wired or wireless communication link 18. One embodiment of the invention is a computer loaded with a program for encoding a 4D color barcode in accordance with the embodiments of the present invention. Another embodiment of the invention is a printer having a processor and a read-only memory (ROM) loaded with a program for rendering a 4D color barcode in accordance with the embodiments of the present invention. Alternatively the printer 14 may be a stand alone printer not connected with the computer 12. In the other exemplary embodiment shown in FIG. 5(*b*), the system may include a computer 12 and a scanner/camera 16 connected to each other by a network or other wired or wireless communication link 18. One embodiment of the invention is a computer loaded with a program for decoding a 4D color barcode in accordance with the embodiments of the present invention. Another embodiment of the invention is a scanner/camera having a processor and a ROM loaded with a program for capturing a 4D color barcode in accordance with the embodiments of the present invention. Alternatively the scanner 16 may be a stand alone scanner/camera not connected with the computer 12. In many practical applications, the encoding and decoding process may be carried out at different locations, and the printer 14 and scanner 16 (or some other imaging device, such as camera) do not necessarily communicate with each other at the same time. For example, a common practice today is that advertisers print barcodes next to their product commercials on fliers, and customers can simply read the barcodes with their smart phones cameras to obtain additional information about the products encoded in the barcodes.

In addition, although in many instances the exemplary embodiments of the present invention for increasing barcode capacity is implemented in a print-scan loop, it is understood that computers, printers and/or scanners can each individually function to perform certain part of the exemplary process of the present invention method. For example, a computer may be used to generate/encode and/or decode a barcode, a printer may be used generate and/or print a barcode, while a scanner or a camera may be used to read and/or decode a barcode. From a practical application viewpoint, it is not necessary to have all of the devices connected in a network or connected to each other. Furthermore, multifunction printers (MFP) and All-In-One (AIO) devices may used in place of the printer or scanner for generating/capturing barcodes It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A method for encoding a color barcode having a plurality of cells including data cells, comprising the steps of:
   (a) determining a shape, a foreground color and a background color for each data cell to encode digital data, wherein a combination of the shape, foreground color and background color for the data cell is chosen from a plurality of combinations of shapes and foreground and background colors in accordance with a value of the digital data to be encoded in the data cell; and
   (b) coloring for each data cell, a subset of a plurality of pixels in the data cell with the foreground color and a remainder of the pixels with the background color, in accordance with the shape, foreground color and background color for the data cell determined in the step (a).

2. The method of claim 1, further comprising a step of forming a plurality of locator cells.

3. The method of claim 1, further comprising a step of forming a plurality of shape reference cells.

4. The method of claim 1, further comprising a step of forming a plurality of color reference cells.

5. The method of claim 1, further comprising a step of forming a plurality of cells to encode a size of the barcode.

6. The method of claim 1, wherein the foreground and background colors are primary colors of a CYMK color space.

7. The method of claim 6, wherein the foreground and background colors also include hi-fi colors.

8. The method of claim 1, wherein the background color is white.

9. The method of claim 1, further comprising a step of adding one or more white pixels between adjacent data cells.

* * * * *